United States Patent [19]
Fischer et al.

[11] Patent Number: 5,790,124
[45] Date of Patent: Aug. 4, 1998

[54] SYSTEM AND METHOD FOR ALLOWING A PERFORMER TO CONTROL AND INTERACT WITH AN ON-STAGE DISPLAY DEVICE

[75] Inventors: Ronald Albert Fischer; Shane Christian Cooper, both of San Francisco, Calif.

[73] Assignee: Silicon Graphics, Inc., Mountain View, Calif.

[21] Appl. No.: 561,183

[22] Filed: Nov. 20, 1995

[51] Int. Cl.$^6$ .................................................. G06T 15/70
[52] U.S. Cl. ....................... 345/435; 345/473; 352/89; 472/75
[58] Field of Search .......................... 345/435, 473; 352/85, 88, 89; 472/57, 75

[56] References Cited

U.S. PATENT DOCUMENTS

| 5,021,878 | 6/1991 | Lang | 358/93 |
|---|---|---|---|
| 5,023,709 | 6/1991 | Kita et al. | 358/125 |
| 5,055,926 | 10/1991 | Christensen et al. | 358/125 |
| 5,142,803 | 9/1992 | Lang | 40/411 |
| 5,210,604 | 5/1993 | Carpenter | 358/93 |
| 5,231,483 | 7/1993 | Sieber et al. | 358/125 |
| 5,310,349 | 5/1994 | Daniels et al. | 434/350 |
| 5,320,538 | 6/1994 | Baum | 434/307 |
| 5,322,441 | 6/1994 | Lewis et al. | 434/307 |
| 5,365,266 | 11/1994 | Carpenter | 348/61 |
| 5,367,315 | 11/1994 | Pan | 345/156 |
| 5,367,614 | 11/1994 | Bisey | 395/119 |
| 5,414,256 | 5/1995 | Gurner et al. | 250/221 |
| 5,423,554 | 6/1995 | Davis | 273/437 |
| 5,528,425 | 6/1996 | Beaver | 352/85 X |

OTHER PUBLICATIONS

Deering, "Explorations of Display Interfaces for Virtual Reality", IEEE Virtual Reality, 1993 Int'l Symposium, pp. 141–147, 1993.

"GMD Digital Media Lab: 24/11/94 Demo", http://viswiz.gmd.de/DML/config/n24.html.

"3DK: the Virtual Studio", GMD, http://viswiz/gmd.de/DML/vst/vst.html (referring to Nov. 1994 demo).

"Silicon Studio Transforms Television With Revolutionary 3D Virtual Set Technology", http://192.82.208.20/News/Archive/9504NABvirtualset.html, Apr. 1995.

Primary Examiner—Mark K. Zimmerman
Attorney, Agent, or Firm—Sterne, Kessler, Goldstein & Fox, PLLC

[57] ABSTRACT

A performance or show production system and method allows a performer to control and interact with an on-stage display or screen. The on-stage screen is used to create a virtual extension of the stage. Images displayed on the screen may include video playback and real-time generated, texture mapped graphics. The system includes a media production system for producing visual images, a display system for displaying the visual images, a tracking system for tracking the position of the performer on the stage and for producing a position indication, and a control system for controlling the production of visual images by the media system as a function of the position of the entertainer on the stage.

31 Claims, 12 Drawing Sheets

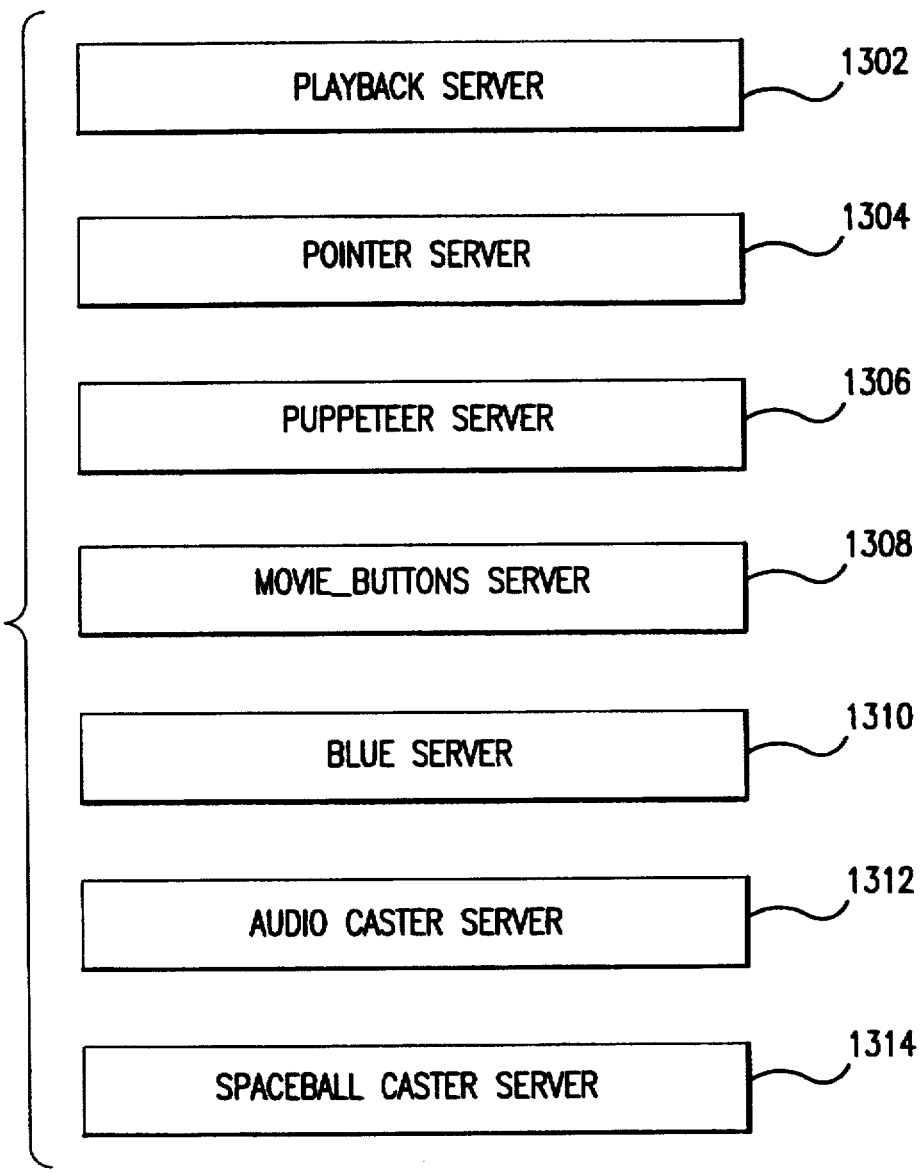

SYSTEM AND METHOD FOR ALLOWING A PERFORMER TO CONTROL AND INTERACT WITH AN ON-STAGE DISPLAY DEVICE

BACKGROUND OF THE INVENTION

1. Field of the Invention

The invention relates generally to stage performances and, more particularly, to a system and method for allowing a performer to control and interact with an on-stage display.

2. Related Art

Video displays or screens are commonly used as part of an on-stage performance. For example, while a performer is addressing an audience, a video segment may be played on a screen at the back of the stage. The video segment can take on varying degrees of involvement in the performance. For example, a performer may treat the video segment as background and ignore it all together, she may narrate or comment on the video segment, or she may interact with the video segment.

In the case that the performer wishes to interact with the video segment, the traditional approach has been to play a video segment to which the performer's actions have been carefully choreographed. When properly choreographed, the performer may appear to interact with the screen so that the images on the screen appear to be an extension of the stage. This, however, requires careful timing and plenty of practice. In addition, this type of interaction is inflexible in that the performer must follow a preset script.

Another traditional approach has been to have the performer or an offstage assistant manually control the video projection equipment. This approach, however, also requires a certain degree of choreography and manual synchronization. If not properly choreographed and synchronized, the performance will not appear seamless. Furthermore, this technique is still not completely flexible with regard to the performer's interaction with the video production.

It is desired to have a system which allows the performer to interact with the screen in a manner that appears seamless to an audience so that the screen becomes a virtual extension of the stage. It is also desired to allow the performer to control the interaction so that he is not limited to a choreographed script.

SUMMARY OF THE INVENTION

The invention is a performance or show production system and method that allows a performer to control and interact with an on-stage display or screen. The on-stage screen is used to create a virtual extension of the stage. Images displayed on the screen may include video playback and real-time generated, texture mapped graphics. In the preferred embodiment, an on-stage performer can control the display of images on the screen in several ways. First, the images on the screen can track the position of the performer's body on the stage. For example, as the performer moves to the right side of the stage, the image on the screen will move left. This effect can be used to give the illusion that the performer is moving about in a virtual environment.

Second, the performer may use a pointer to high-light items in the images on the screen. The pointer acts like a virtual flashlight. The pointer may also be used to make selections from a menu displayed on the screen by, for example, pressing a button on the pointer. Third, trigger positions or virtual buttons may be defined in three-dimensions on the stage so that when a performer enters a particular position on the stage, an event is triggered.

The invention also provides real-time generated graphical images of puppets that are controlled by one or more puppeteers and interact with the performer.

In addition to controlling the display of images, the system receives an audio signal and provides a MIDI (musical instrument digital interface). The audio signal is from a microphone which receives the on-stage performers voice and possibly the sound from any acoustic instruments being played by the performer. The MIDI provides an interface to musical instruments such as keyboards, drum machines or synthesizers. The MIDI also provides an interface to stage lighting.

The system of the invention includes a media system for producing visual images, a display system for displaying the visual images, a tracking system for tracking the position of the performer on the stage and producing a position indication, and a control system for receiving the position indication from the tracking system and for controlling production of visual images by the media system as a function of the position of the entertainer on the stage. The visual effect that is attained is that the performer appears to interact with objects on a virtual stage.

The media system includes a video system for producing video images, a graphics system for producing graphics images, and a combiner for combining the video images and the graphics images to produce the visual images. The video system includes a video playback system for producing the video images from prerecorded video storage media. The video system may also include a storage system for storing compressed video images and a decompression system for decompressing the compressed video images to produce the video images.

In a preferred embodiment, the video images include background video images and foreground video images or textures. In this embodiment, the video system includes a video playback device for producing the background video images from prerecorded video storage media, a storage system for storing compressed video images, and decompression system for decompressing the compressed video images to produce the foreground video images. The graphics system is a computer for generating real-time graphics images. Foreground video images or textures are decompressed and texture mapped on graphics images (objects/geometry) via a video processing computer. The combiner is a chromakeyer which combines graphics images containing texture mapped foreground video images with the background video images.

The display system includes a display screen having a size large enough relative to the stage so as to appear to an audience as a virtual extension of the stage, and a high definition video projection system to project the visual images unto the display screen. The tracking system includes A transmitter attached to the performer for emitting a locating beacon, and A sensor array, mounted in fixed position relative to the stage, for receiving the locating beacon and for determining the position of the performer on the stage. The control system causes the visual images to change as the performer moves on the stage to give the illusion to an audience that the performer is moving about in a virtual scene which includes the display system. The control system further initiates performer control of the visual images upon the performer entering a predetermined place on the stage (as indicated by the tracking system).

The system of the invention may further include a blue screen set up for selectively integrating a video image of the performer into the visual image displayed on the display. For example, as the performer walks off stage, she may pass a position (as indicated by the tracking system) which turns on the blue screen set up. Then, as the performer walks in front of a blue screen/camera set up, she may appear to walk in to the scene being displayed on the screen. She may also interact with the audio portion of the system.

The foregoing and other features and advantages of the invention will be apparent from the following, more particular description of a preferred embodiment of the invention, as illustrated in the accompanying drawings.

BRIEF DESCRIPTION OF THE FIGURES

The present invention as defined by the claims is better understood with reference to the written description read in conjunction with the following drawings. In the drawings, like reference numbers are used to indicate like elements. Also in the drawings, the left most digit of each reference number corresponds to the figure in which the reference number is first used.

FIG. 13 is a block diagram illustrating the server programs of the invention.

DETAILED DESCRIPTION OF THE PREFERRED EMBODIMENTS

The preferred embodiment of the invention is discussed in detail below. While specific part numbers and/or configurations are discussed, it should be understood that this is done for illustration purposes only. A person skilled in the relevant art will recognize that other components and configurations may be used without parting from the spirit and scope of the invention.

Overview

Figure 1:
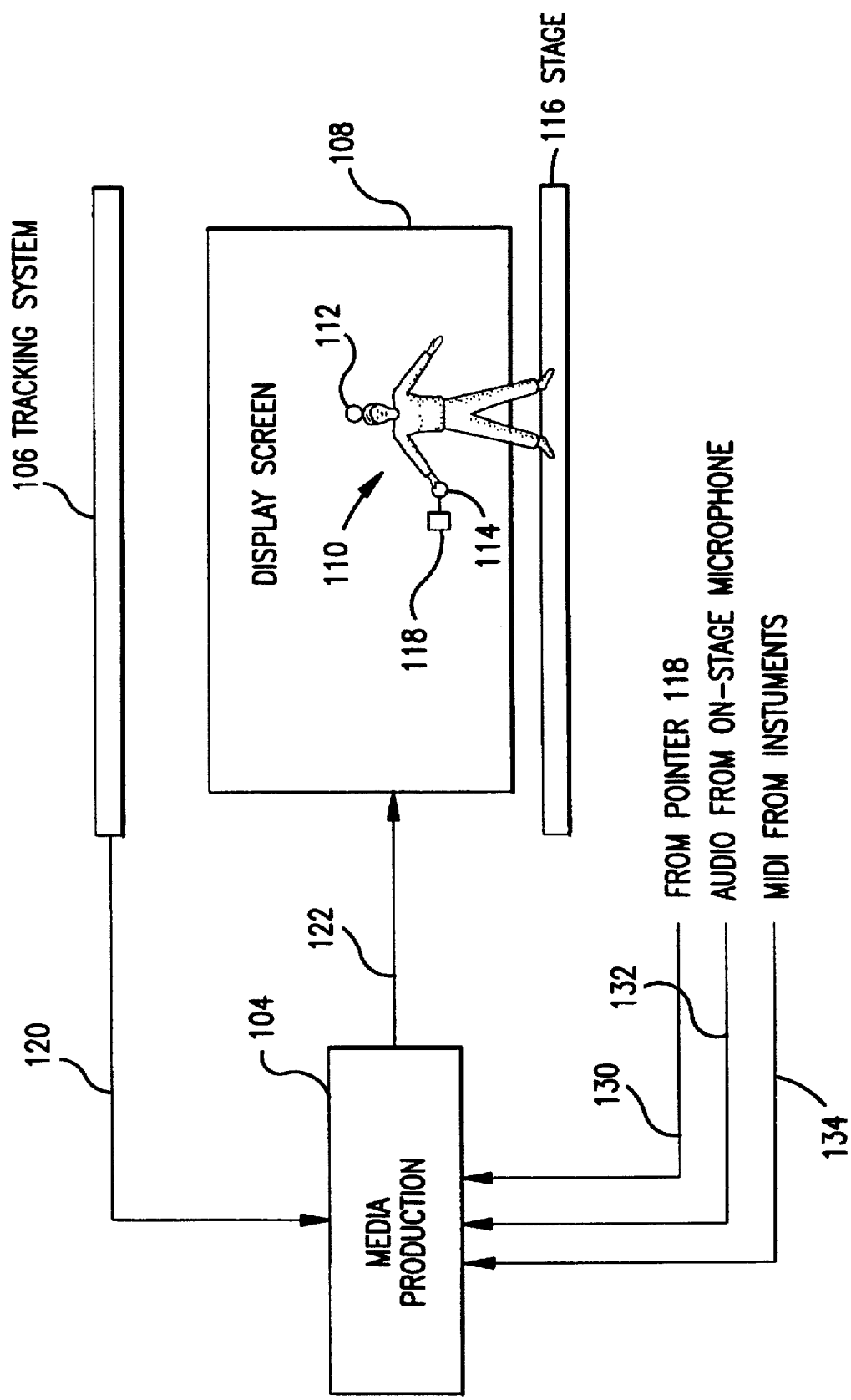
FIG. 1 is a diagram illustrating the present invention.

A high level block diagram of the system of the invention is illustrated in FIG. 1. Referring now to FIG. 1, a performer 110 is shown on a stage 116 in front of a display screen 108.

A tracking system 106 tracks the position on stage 116 of performer 110 and provides a position indication 120 to a media production system 104. Media production system 104 generates images 122 as a function of the position indication and displays the images on screen 108. For example, the image produced by media production system 104 may include an image of a room. As the performer moves toward screen 108, media production system 104 may zoom into the image of the room displayed on the screen so that it appears to the audience that the performer is actually walking into screen 108. Thus, it appears that the screen is a virtual extension of the stage.

Tracking system 106 tracks performer 110 using a performer position transmitter 112. Transmitter 112 is mounted, for example, on the head of the performer. Tracking system 106 receives a signal from transmitter 112 and uses this signal to determine the position of the performer.

To permit additional interaction between performer 110 and the images displayed on screen 108, performer 110 is provided with a pointer 118 and a performer hand position transmitter 114. Transmitter 114 is similar to transmitter 112. Tracking system 106 uses transmitter 114 to determine the position of the performer's hand relative to the stage. Pointer 118 is used together with transmitter 114 and tracking system 106 to allow performer 110 to point and select items in an image on screen 108. For example, pointer 118 is used to select a point on screen 108 (e.g., by moving an on-screen cursor). Given this point and the location of pointer 118 (i.e., the location of hand position transmitter 114), media production system 104 can compute a line connecting the pointer and the point on screen 108. Media production system 104 can then generate, for example, an image of a cone of light in the image on the screen. Thus, it will appear to an audience that the performer is using a flashlight or other pointing device to "select" items in the screen image. This allows the performer to highlight an item for the viewing audience.

Furthermore, given the ability to point, the performer may interact with the images on the display screen much like a computer user interacts with a menu in a point-and-shoot type computer application. To accomplish this, pointer 118 provides a pointer signal 130 to media production system 104. This allows the user to have further control over the production of media images by media production system 104.

Media production system 104 produces audio to accompany the visual images displayed on screen 108. As shown in FIG. 1, media production system 104 receives audio signals 132 from one or more on-stage microphones. These microphones pick-up, for example, the performers voice and any acoustic instruments. Media production system 104 also receives MIDI (musical instrument digital interface) signals 134 from any musical instruments such as synthesizers, keyboards, drum machines, etcetera, on or off of the stage.

Images 122

Figure 2:
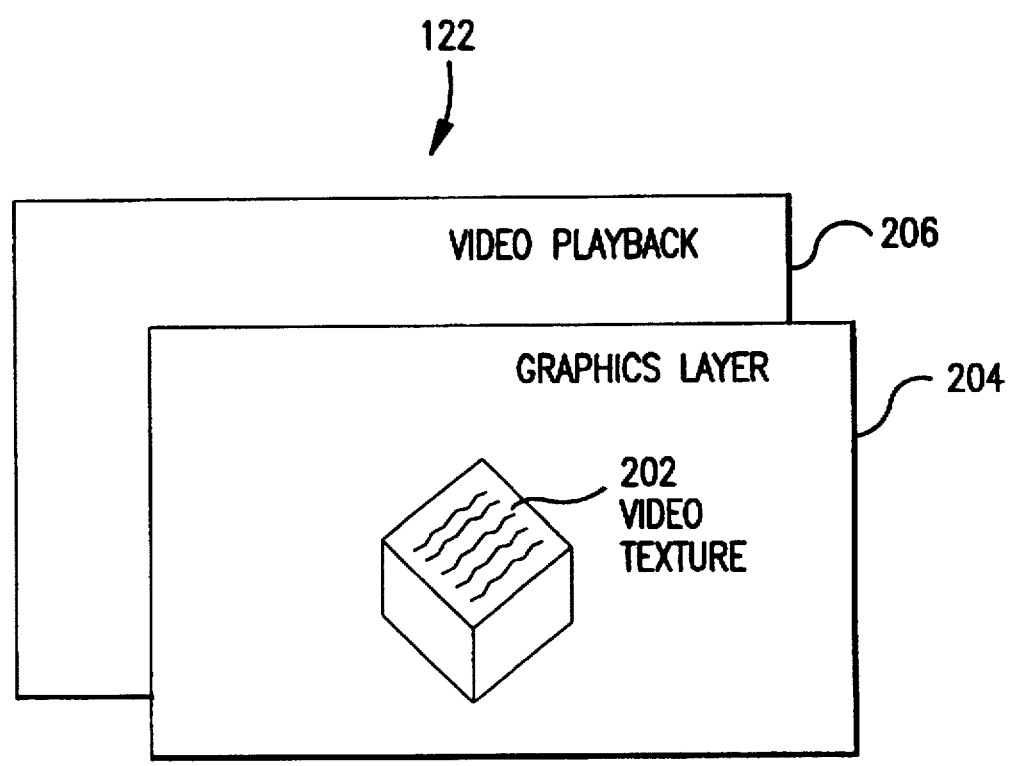
FIG. 2 illustrates a preferred composition of image layers used to produce an image to be presented to an audience.

A variety of images 122 may be displayed on screen 108. The content of images 122 will vary with the content of the presentation being made by the performer. However, in the preferred embodiment, images 122 are formed from three components, illustrated in FIG. 2. These three components of images 122 include a video playback layer 206, a graphics layer 204 and a texture mapped video texture layer 202. These components may be used, for example, as follows.

During a performance, video playback layer 206 may be used to display a pre-recorded background video image 206. Graphics layer 204 may be used to display real-time generated graphics images that are overlaid on video playback layer 206. Video texture layer 202 may be used to map textures onto elements of graphics layer 204.

For example, while a motion picture is being played and displayed on video playback layer 206, a real-time generated graphical image of an animated character may be displayed in graphics layer 204. Finally, a video image may be texture mapped onto the animated character using video texture layer 202. This three layer system allows for sufficient flexibility to produce a variety of performance images. However, if desired, additional video or graphics layers may be used and/or, alternatively, the arrangement of the layers may be modified.

Media Production System 104

Figure 3:
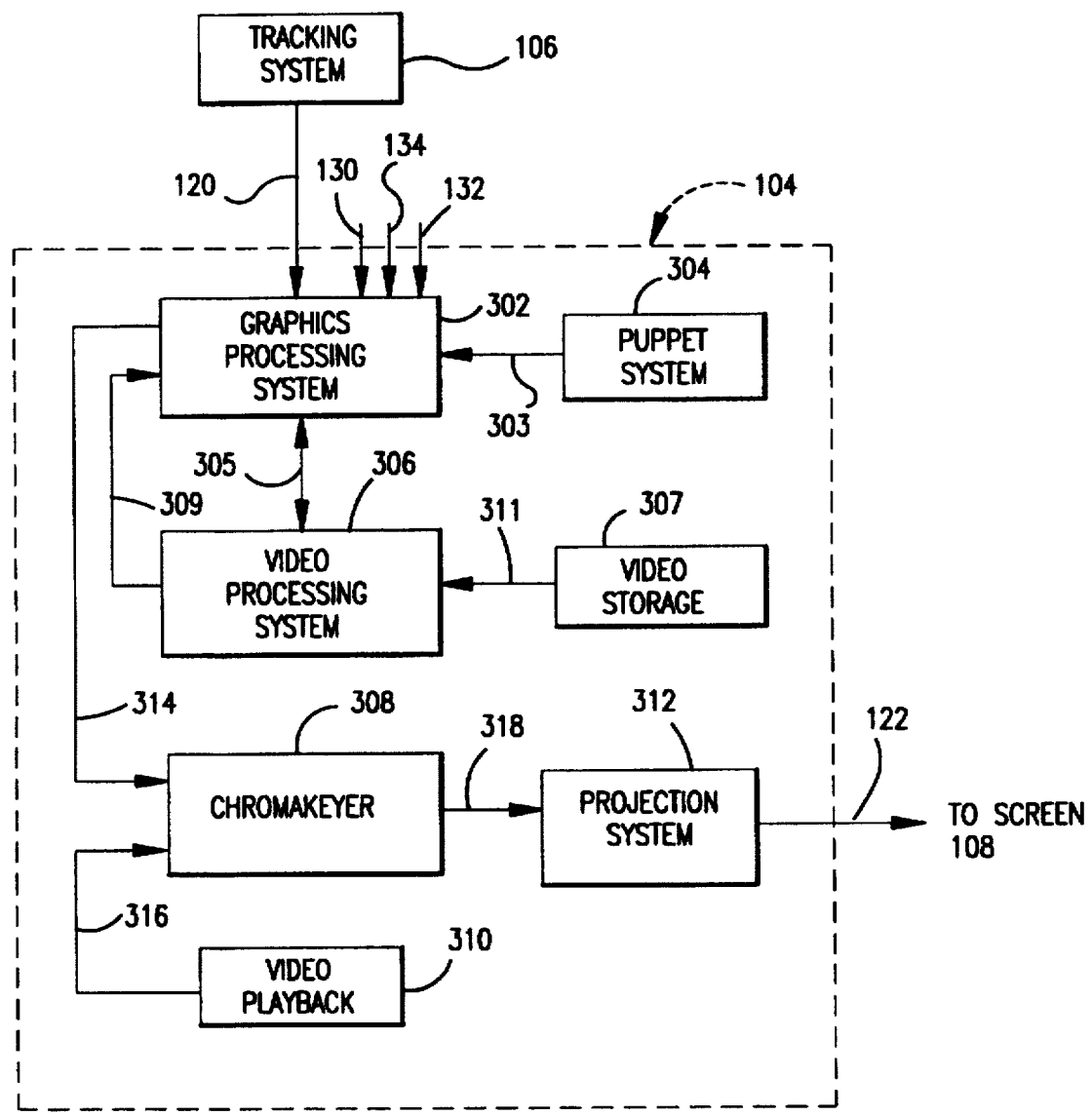
FIG. 3 is a block diagram of a media production system 104 and a tracking system 106 in accordance with a preferred embodiment of the present invention.

FIG. 3 shows a high level block diagram of media production system 104. Media production system 104 generates visual images 122 to be displayed on screen 108. Media production system 104 includes a graphics processing system 302, a video processing system 306, a chromakeyer 308, a video playback system 310, a puppet system 304, a video storage system 307 and a projection system 312.

Graphics processing system 302 receives position indication 120 from tracking system 106, receives puppet control inputs 303 from puppet system 304, and generates all real-time graphics of graphics layer 204. In addition, graphics processing system 302 receives pointer indication 130 from pointer 118, MIDI inputs 134 from various instruments and audio inputs 132 from on-stage microphones.

Video processing system 306 retrieves compressed video 311 from video storage system 307 and provides a video signal 309 representing video texture layer 202 to graphics processing system 302. Graphics processing system 302 then produces real-time, texture-mapped, graphics images 314. Graphics Video processing system 306 and graphics processing system 302 communicate control and other signals via an ethernet bus 305.

Video playback system 310 produces a video playback signal 316. As described in detail below, video playback system 310 is controller by video processing system 306 via a serial control line (not shown in FIG. 3). Chromakeyer 308 combines texture-mapped, graphics images 314 with video playback signal 316 to produce image signal 318. Projection system 312 then converts image signal 318 to visible images 122 to be displayed on screen 108.

Performance Production System 400

Figure 4:
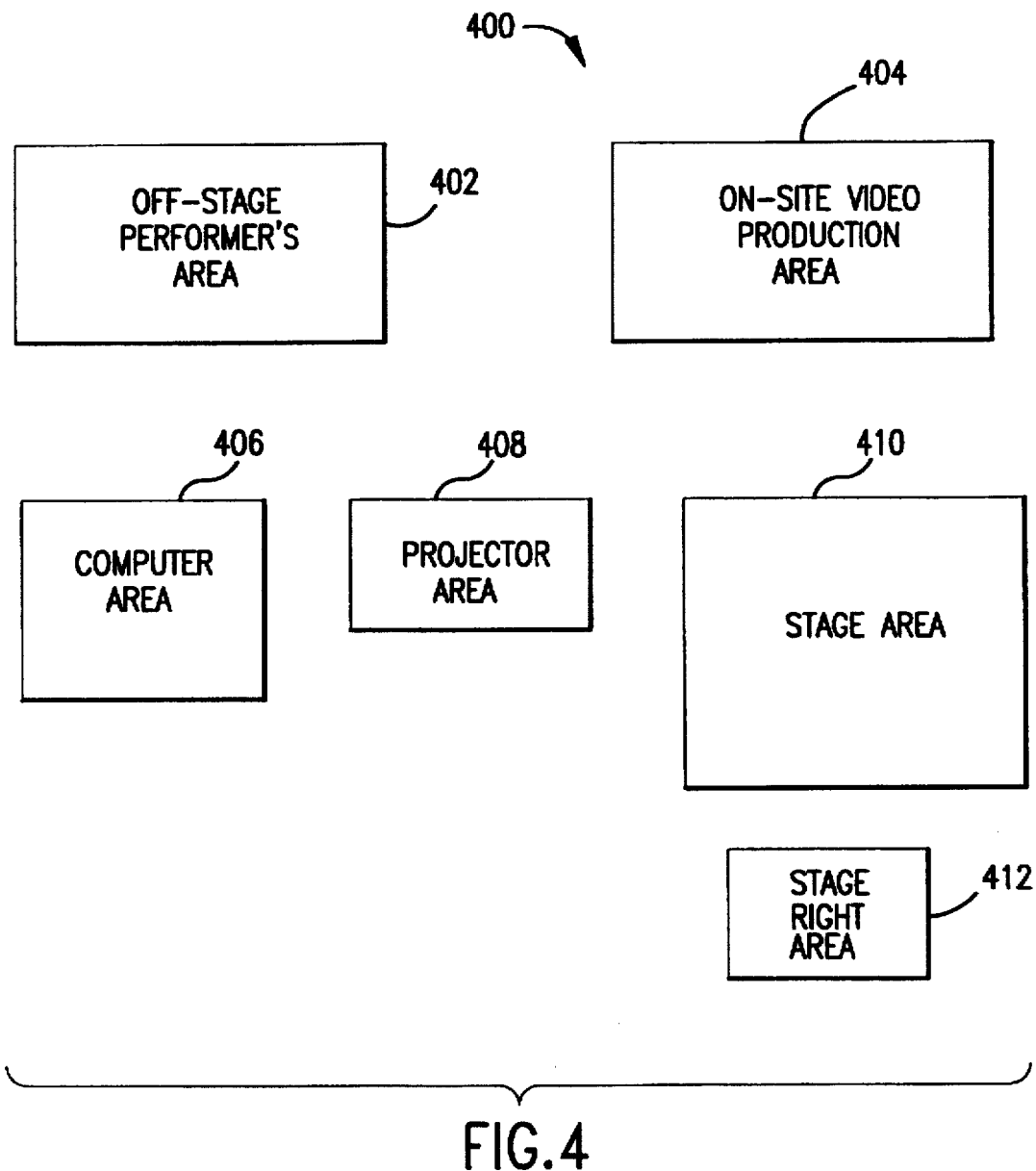
FIG. 4 is a block diagram illustrating organization of a performance production system 400 according to a preferred embodiment of the present invention.

In the preferred embodiment, the invention is incorporated into a performance or show production system 400, shown in FIG. 4. System 400 includes a total package of equipment required to produce a stage performance in which video/graphics images are displayed on a screen to create a virtual stage with which one or more performers may interact. System 400 is organized into an off-stage performer's area 402, an on-site video production area 404, a computer area 406, a projector area 408, a stage area 410 and a stage right area 412. Tracking system 106 and media production system 104 are implemented, along with additional equipment, into system 400 as described in further detail below.

Figure 5:
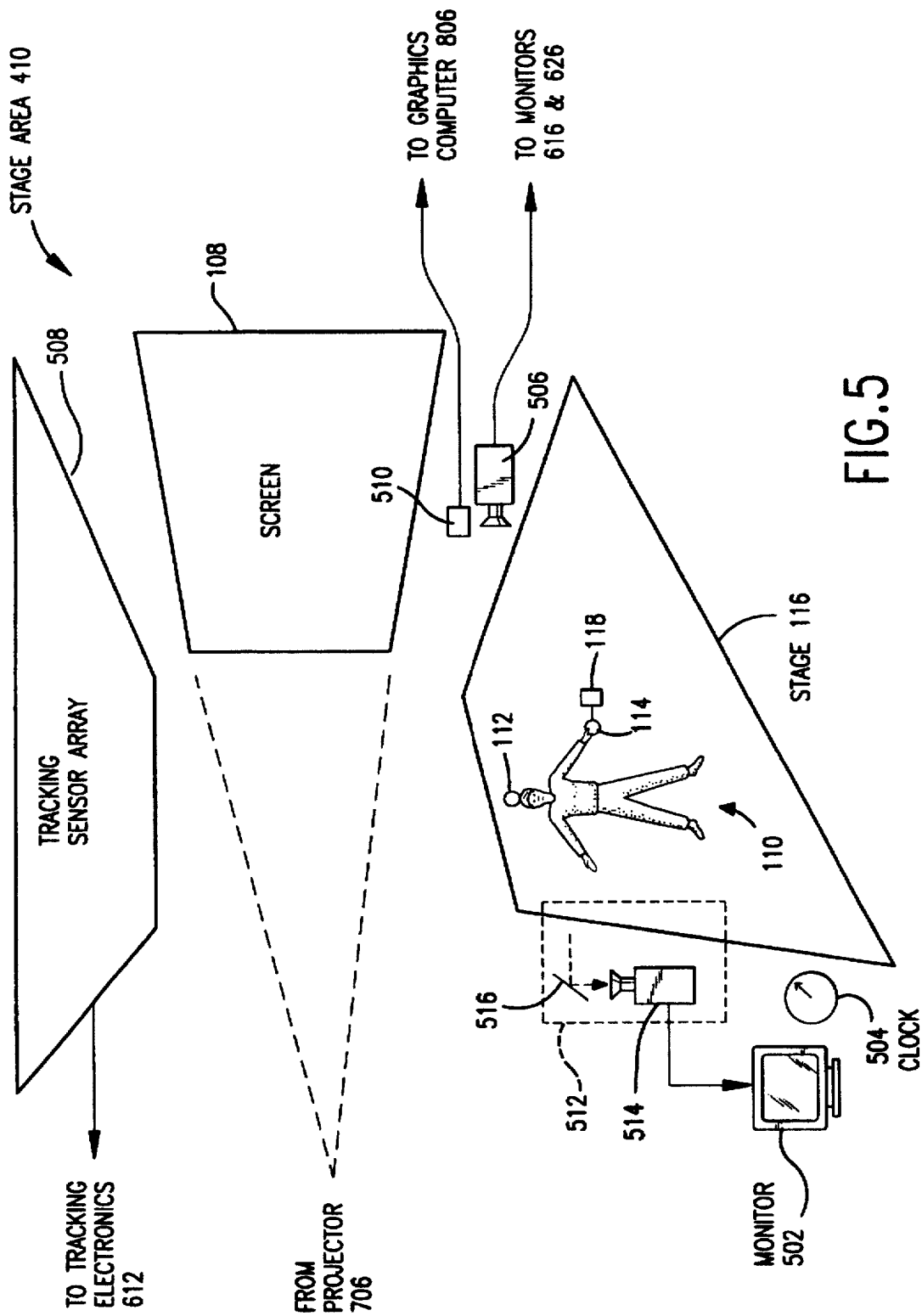
FIG. 5 illustrates a stage area 410 according to a preferred embodiment of the present invention.

Stage Area 410 =p Stage area 410 is illustrated in FIG. 5. Stage area 410 includes stage 116, screen 108, a tracking sensor array 508, a performer's camera assembly 512, a stage monitor 502, a stage clock 504, a puppeteer's stage camera 506 and a pointer receiver 510. Tracking system 106 includes tracking sensor array 508 and tracking electronics 612 (see FIG. 6). Tracking sensor array 508 receives position signals from transmitters 112 and 114 and provides position information to tracking electronics 612.

In the preferred embodiment, tracking system 106 is a Wybron Autopilot, available from Wybron, Inc., Colorado Springs, Colo. Transmitters 112 and 114 are ultrasonic transmitters that are included in the Wybron system. The position signals 120 (including the performer's position and the performer's arm position) are taken from the diagnostic serial port of the Wybron system.

Also in the preferred embodiment, pointer 118 is a wireless, infrared mouse. Pointer receiver 510 is an infrared receiver. Pointer 118 and receiver 510 control a cursor displayed on screen 108. In the preferred embodiment, pointer 118 and receiver 510 are a Propoint, available from Interlink Electronics, Camarillo, Calif. The cursor is generated by graphics computer 806 (see FIG. 8). The cursor allows the performer to point to or highlight, for an audience, elements displayed on screen 108. The cursor also allows the performer to interact with graphics computer 806 to make menu selections. Thus, the performer preferably interacts with/controls the images on screen 108 in four ways: with pointer 118, by her position on stage 116 (as detected by tracking system 106), via audio (voice an acoustic instruments), and via MIDI instruments.

Performer's camera assembly 512 captures a video image of the performance from an audience perspective and displays it on monitor 502 for viewing by the on-stage performer. Camera assembly 512 includes a camera 514 and a mirror 512. Camera 514 is mounted parallel to the front edge of the stage. Mirror 516 is oriented at a 4° angle with respect to the image plane of camera 516. This arrangement allows camera 516 to capture an image of the performance which, when displayed on monitor 502, will appear to the performer to be a mirror image so that her image on monitor 502 will move toward stage right when she moves toward stage right.

Puppeteer's camera 506 provides a view of the stage and performer from the perspective of screen 108 (i.e., the view seen by a puppet in screen 108). This allows one or more puppeteers to interact with the performer. The video signal from camera 506 is sent to monitors 616 and 626 (see FIG. 6) in off-stage area 402.

A stage clock 504 is also provided in stage area 410. The interactive nature of the present invention allows a performer to modify her performance based on, for example, audience reaction. Thus, the precise running time of a performance may vary from day to day. Stage clock 504 provides the time to the performer so that she can stay within certain limits of performance length.

In addition to having the image on the screen being controlled by the position of the performer on the stage, the images on the screen may be controlled by other sources. For example, many electronic musical instruments provide a digital output which conforms to the MIDI (musical instrument digital interface) standard. The MIDI signals may be used by graphics processing system 302 to control visual representation of instruments or other objects displayed on the screen. For example, a graphical image of a keyboard displayed on the screen may mimic the keystrokes make by the performer on a MIDI keyboard. For another example, an arbitrary object may change size or color as a function of the audio signal from the MIDI instrument.

Off-Stage Area 402

Figure 6:
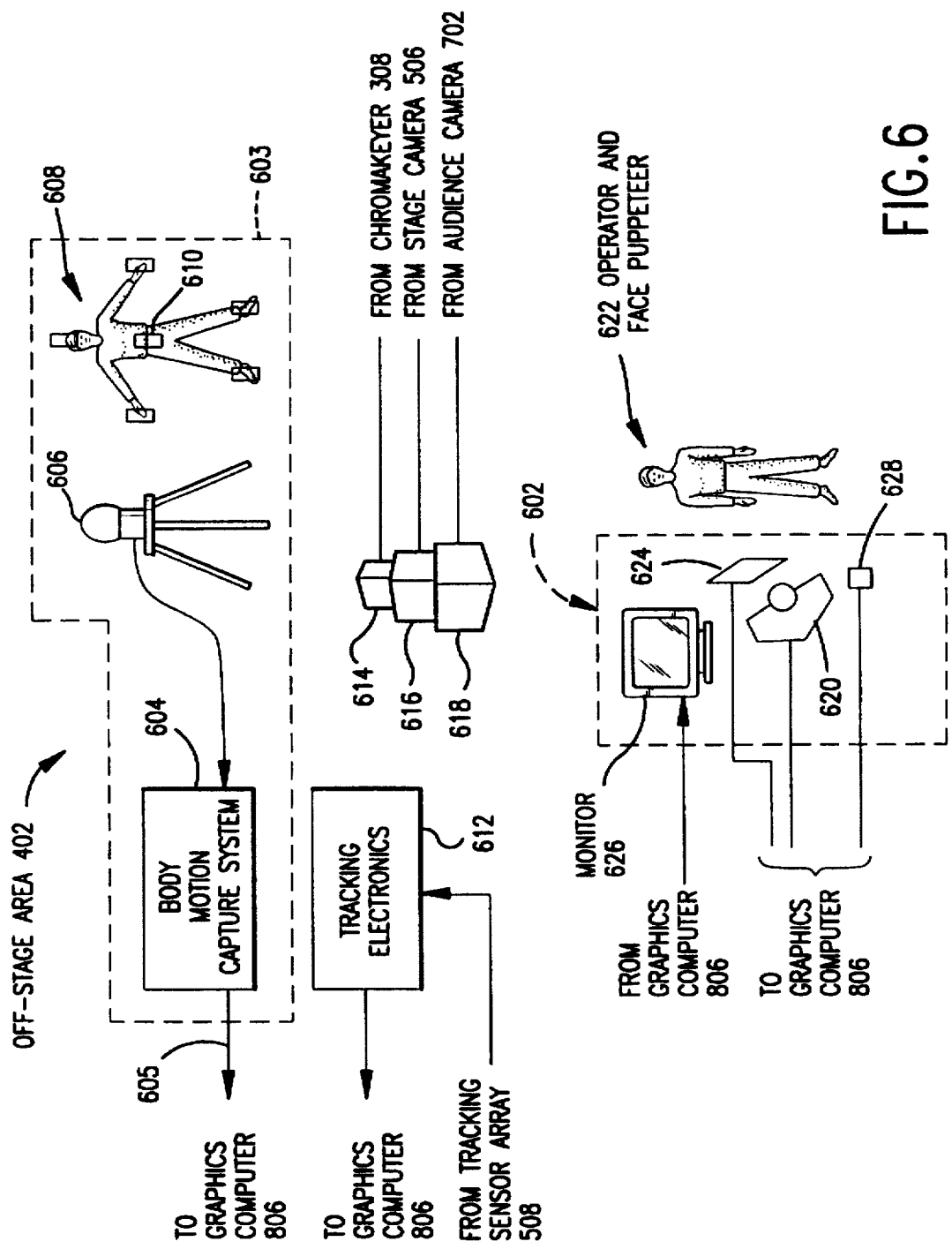
FIG. 6 illustrates an off-stage area 402 according to a preferred embodiment of the present invention.

Off-stage area 402 is illustrated in FIG. 6. Off-stage area 402 includes a full-body puppet system 603; tracking electronics 612 for tracking system 106; monitors 614, 616 and 618; and head for graphics computer 806 (see FIG. 8). Full-body puppet system 603 includes a body motion capture system 604, a body motion capture receiver 606 and body motion indicators (also called birds) 610. Birds 610 are attached to various parts of the body (e.g., arms, legs, torso, head) of a body puppeteer 608. Body motion capture receiver 606 receives signals indicating the positions of various parts of the puppeteer's body from birds 610 and provides the signals to body motion capture system 604. Body motion capture system 604 then outputs a puppet control signal 605 to graphics computer 806. In the preferred embodiment, puppet system 603 is an Ascension "Flock of Birds" motion capture system, available from Ascension Technology, Burlington, Vt.

Head 602 for graphics computer 806 (see FIG. 8) includes a monitor 626, keyboard 624, spaceball (pointing device) 620 and a mouse 628 for control and interaction with graphics computer 806. An operator 622 uses head 602 to control the performance from graphics computer 806. In the preferred embodiment, operator 622 is also the face puppeteer. That is, operator 622 uses spaceball 620 to control the facial expressions of an on-screen puppet. X rotation of spaceball 620 controls eye rotation, Z rotation controls eyelid blink and Y translation controls smile/frown. As described above, the body of the puppet is controlled by puppeteer 608. Operator 622 may also control the voice of the puppet. To do so, an audio signal (not shown) is provided to graphics computer 806.

Monitor 614, 616 and 618 provides various views of the performance for use by puppeteers 608,622. Specifically, monitor 614 receives, from chromakeyer 308, a video signal representing the image on screen 108. Monitor 616 receives a video signal from stage camera 506 representing the view of the performer that a puppet would see looking out from screen 108. Monitor 618 receives a video signal from a puppeteer's audience camera 702 (see FIG. 7) representing the audience's view of the performance.

Projector Area 408

Figure 7:
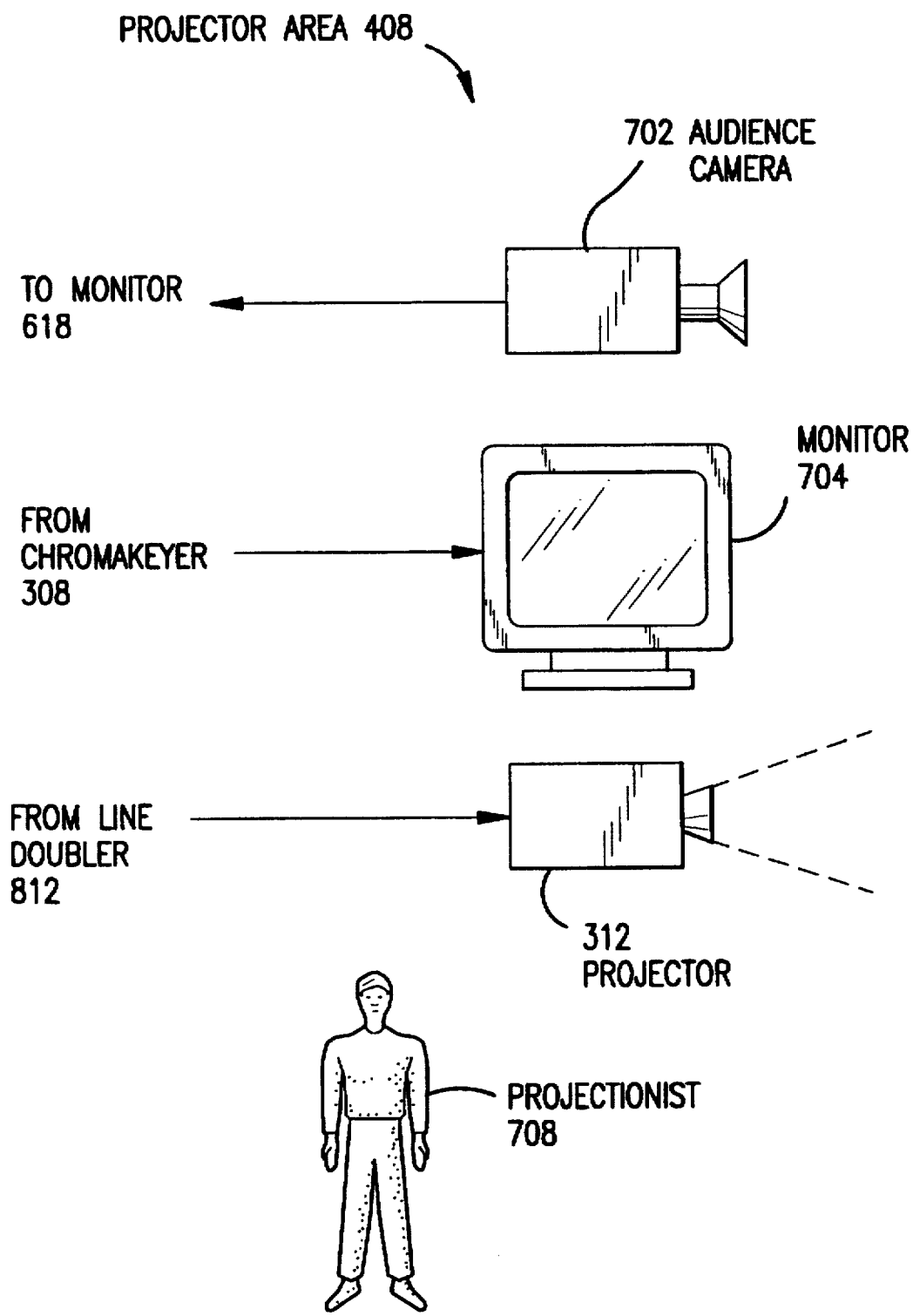
FIG. 7 illustrates a projector area 408 according to a preferred embodiment of the present invention.

Projector area 408 is shown in FIG. 7. Projector area 408 includes projector 312, a preview monitor 704 and puppeteer's camera 702. Projector 706 receives a video signal from chromakeyer 308 (through a line doubler 812, described below) and projects image 122 onto screen 108. In the preferred embodiment, screen 108 is thirty feet long by seventeen feet wide. Projector 706 is, for example, a high resolution, HDTV projector such as a General Electric Triple Light Valve (3LV) projector, available from General Electric Corporation.

Monitor 704 provides a projectionist 708 with a preview image of what is being displayed on screen 108. As described above, audience camera 702 provides the face and body puppeteers with an audience view of the performance.

Computer Area 406

Figure 8:
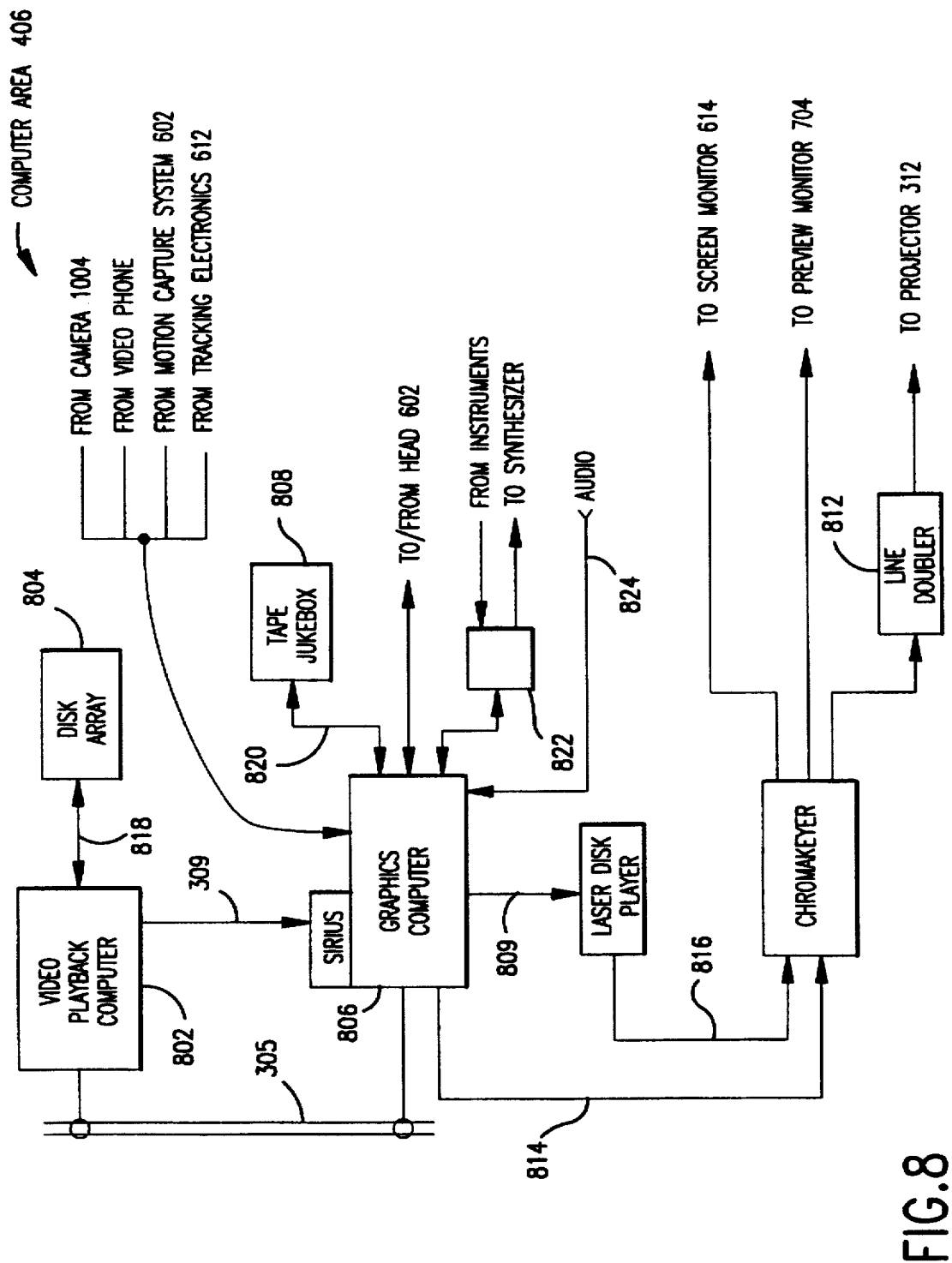
FIG. 8 illustrates a computer area 406 according to a preferred embodiment of the present invention.

Computer area 406, illustrated in FIG. 8, contains the majority of the computer equipment required for the performance. This equipment may be located near the stage. Alternatively, computer area 406 may be located in a computer truck or at a remote site. Computer area 406 includes a video texture playback computer 802, a disk array 804, a graphics computer 806, a tape jukebox 808, a laser disk player 810, chromakeyer 308 and a line doubler 812.

Disk array 804 is for storing compressed video. Disk array 804 is configured to store 120 minutes of 2:1 compressed NTSC video. Video texture playback computer 802 communicates with disk 804 via SCSI bus 818. Playback computer 802 receives the compressed video from disk array 804, decompresses the video and provides decompressed video to graphics computer 806 via video output 309. The decompressed video represents video texture layer 202 of image 122.

Graphics computer 806 generates all real-time graphics (graphics layer 204) for image 122. Graphics computer 806 also texture maps the decompressed video elements from playback computer 802 and controls playback of video from laser disk player 810. Graphics computer 806 communicates with playback computer 802 via ethernet bus 305. Graphics computer 806 also receives input from a blue screen camera 1004 (see FIG. 10), a video telephone (not shown), body motion capture system 602 and tracking electronics 612. Graphics computer 806 controls laser disk player 810 via a serial control line 809 (e.g., an RS-232).

Graphics computer 806 receives an audio input 824 from on-stage microphones and communicates with MIDI instrument via midiator 822. Mediator 822, made by Key Electronics, Fort Worth, Tex. [?], provides an interface between a serial port of computer 806 and MIDI devices. For example, computer 806 receives input from MIDI instruments via mediator 822, and drives a sound synthesizer via mediator 822.

Tape jukebox 808 is a digital linear tape (DLT) autochanger system used to backup all system software and show digital content. Jukebox 808 communicates with graphics computer 806 via SCSI bus 820.

Laser disk player 810 is a Sony CRV (component video) laser disk player. Player 810 provides a component NTSC video signal 816 to chromakeyer 308. Graphics computer 814 provides a component NTSC video signal 814 to chromakeyer 308. Chromakeyer 308 combines video signals 814 and 816 to produce video images 122. In the preferred embodiment, chromakeyer 308 is an Ultimatte 6, available from Ultimatte Corporation, Chatsworth, Calif.

The output of chromakeyer 308 is looped or split to provide three video image outputs. A first output is provided to a line doubler 812. The output of line doubler 812 is then provided to projector 312 for projection to screen 108. Line doubler 812 enhances the apparent resolution of video images 122. In the preferred embodiment, line doubler 812 is a model LD-100, available from Faroudja Labs, San Jose, Calif.

A second output of chromakeyer 308 is provided to screen monitor 614 for use by puppeteers 608,622. A third output of chromakeyer 308 is provided to preview monitor 704 for use by projectionist 708.

In the preferred embodiment, playback computer 802 is an Indigo$^2$ computer with Galileo and Cosmo boards. Graphics computer 806 is an Onyx Reality Engine$^2$ computer equipped with a Sirius video option and a Vigra audio board (i.e., the puppet's voice from the face puppeteer). Both of these computers are available from Silicon Graphics Incorporated, Mountain View, Calif. The video output of the Indigo$^2$ Galileo board is output to the Sirius video option of the Onyx Reality Engine$^2$. Graphics computer 806 also receives the inputs from blue screen camera 1004, a video telephone (not shown), body motion capture system 602 and tracking electronics 612.

Computer area 406 also includes related support equipment such as video sync generators, monitors, video waveform oscilloscopes, etcetera. The utilization of such support equipment will be within the ability of a person skilled in the relevant art.

On-site Video Production Area 404

Figure 9:
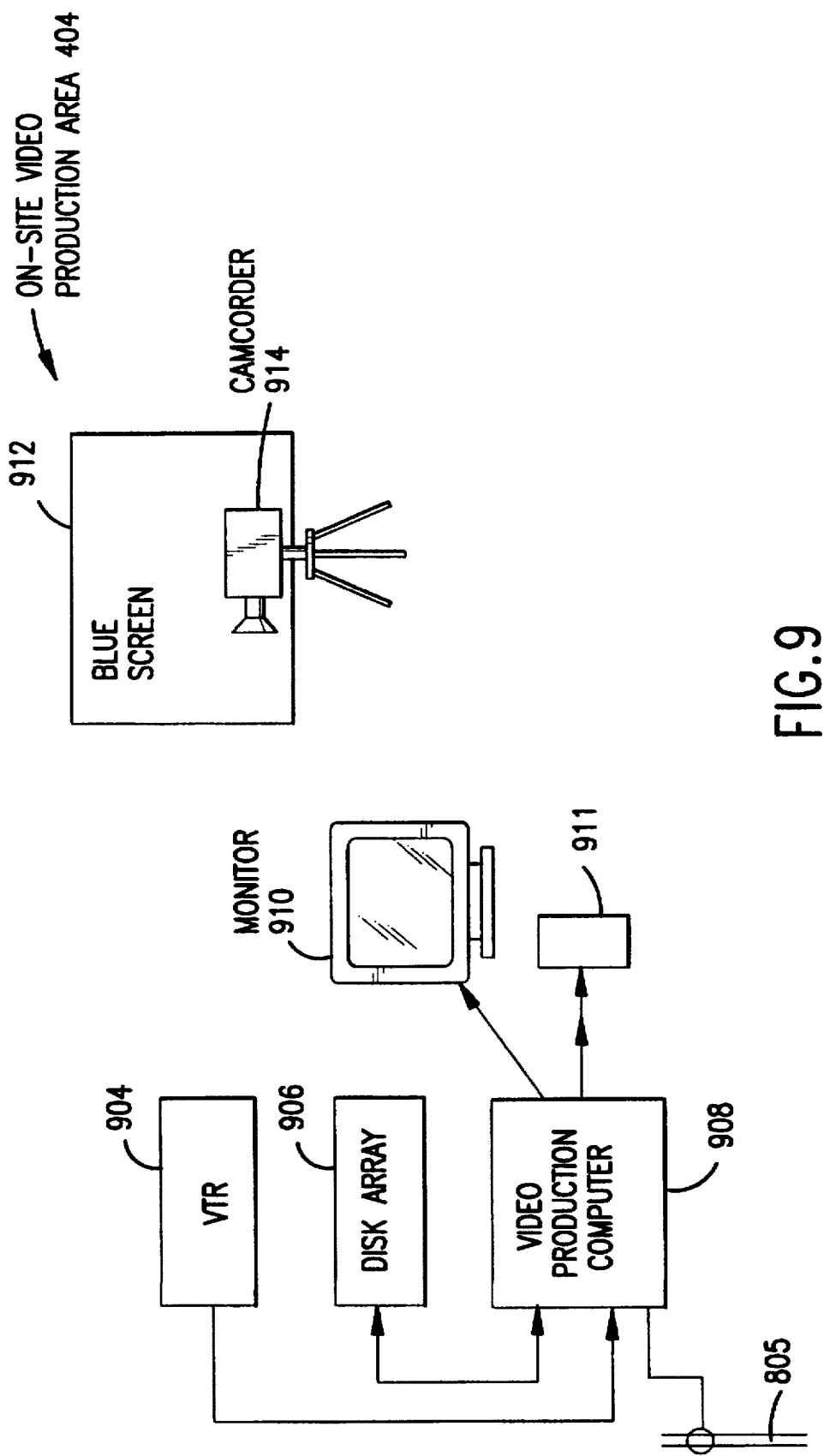
FIG. 9 illustrates an on-site video production area 404 according to a preferred embodiment of the present invention.

An on-site video production area 404, illustrated in FIG. 9, is provided for the production of video segments for use in a performance. For example, a person may be interviewed on-site or such an interview may be recorded from broadcast television. A video segment containing the interview may then be texture mapped (layer 202) onto a sphere or other shape displayed in image 122.

On-site video production area 404 includes one or more video tape recorders (VTRs) 904, a disk array 906, a video production computer 908, a monitor 910, a keyboard 911, a blue screen 912 and a video camera recorder (camcorder) 914. Video tape recorder 904 is used to record video clips from television and to playback video tapes. Blue screen 912 and video camera recorder 914 are used to produce video interviews. Video production computer compresses and stores video segments on disk array 906 and sends compressed segments to graphics computer 806 via ethernet bus 805.

Stage Right Area 412

Figure 10:
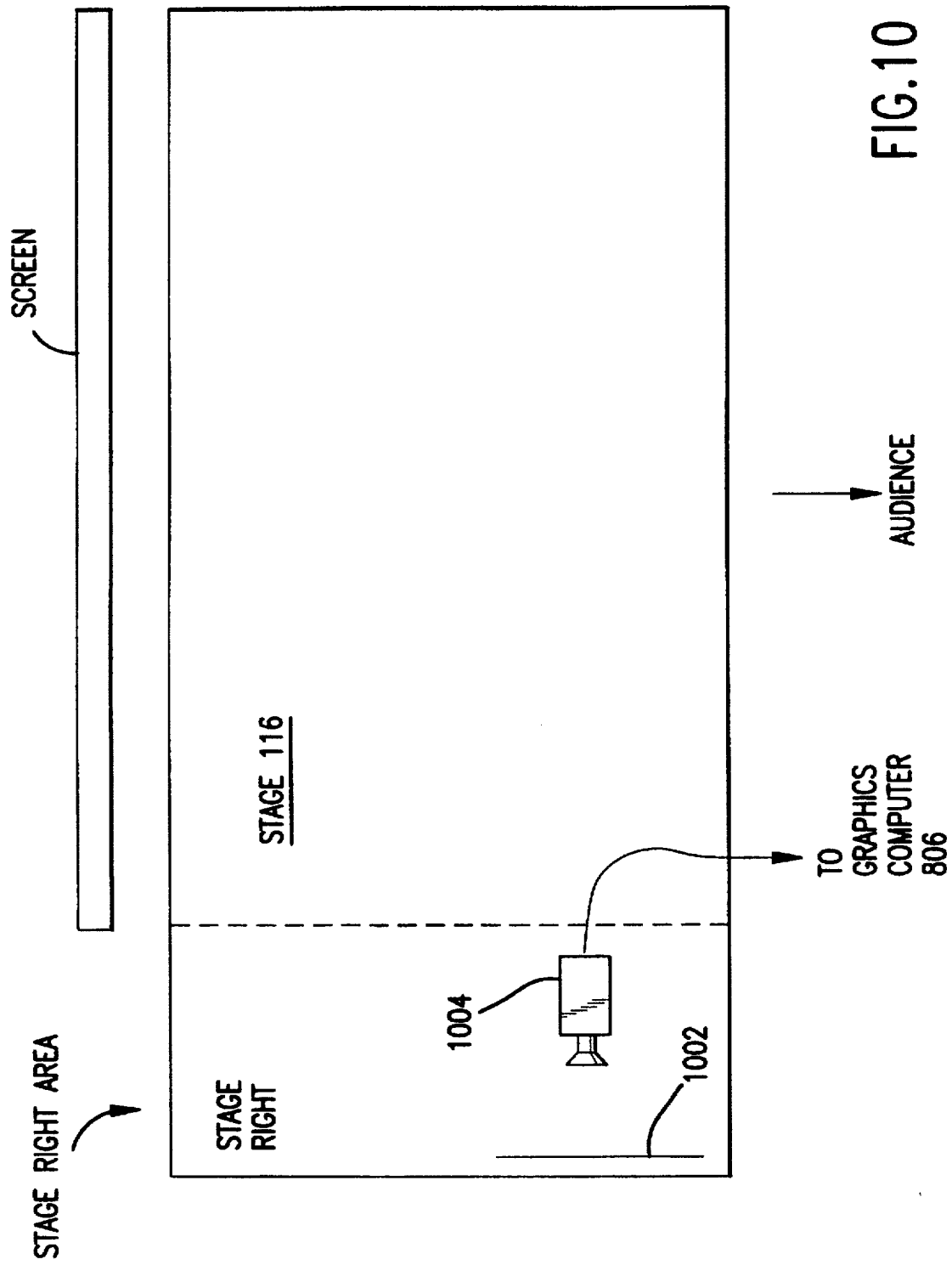
FIG. 10 is a top view of a stage illustrating a stage right area 412 according to a preferred embodiment of the present invention.

Stage right area 412, illustrated in FIG. 10, includes a camera 104 and a blue screen 1002. Stage right area 412 provides an area for performing a blue screen process. For example, the performer may walk off of the portion of the stage that is in-view of the audience and into stage right area 412. As the performer walks past camera 1004 and toward blue screen 1002, camera 1004 will pick up her image. Graphics computer 806 will incorporate the performer's image into image 122 shown on screen 108 so that it appears that the performer has walked off of the stage and into the screen. Alternatively, other performers and stage props may be in this area so that their images can be incorporated with that of the on-stage performer.

System Software

Figure 11:
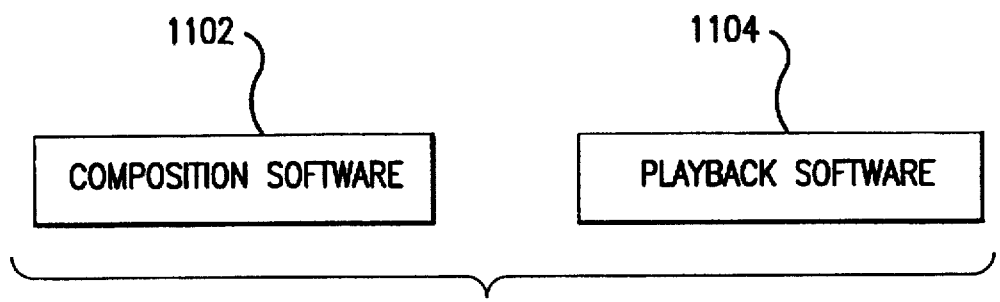
FIG. 11 is a high level block diagram illustrating the organization of the software programs used in the present invention.

Performance production system 400 uses a significant number of software programs. In the preferred embodiment of the invention, all software programs are written in the C++ programming language. These software programs may be separated into two basic processes, scene composition and scene playback or delivery. This is illustrated in FIG. 11. Scene composition is performed by composition software 1102, and scene playback is performed by playback software 1104.

Composition software 1102 creates a representation of the virtual stage in the form of an Open Inventor scene graph. This representation is also referred to herein as "the scene." Open Inventor scene graphs and nodes are fully described in *The Inventor Mentor*, published by Addison-Wesley Publishing Company, the full text of which is incorporated herein by reference. Once created by composition software 1102, this scene or representation of the virtual stage is transferred to the playback software 1104.

In the preferred embodiment, composition software 1102 is a program written atop the Open Inventor toolkit, available from Silicon Graphics, Inc. Composition software 1102 receives digital art elements in the form of three-dimensional model geometry and image texture maps from other applications. The other applications include, for example, Alias PowerAnimator, available from Alias/Wavefront Inc., a subsidiary of Silicon Graphics, Inc. Composition software 1102 reads the digital art elements into "nodes." The "digital art element nodes" are combined with other types of nodes in the scene graph to, e.g. arrange the elements in three-dimensional space or to tie them to events such as the performer's motion on stage or clicks of pointer 118.

Composition software 1102 is an expanded version of the "gview" Open Inventor demonstration program available from Silicon Graphics, Inc. Within composition software 1102, custom nodes, written in Open Inventor, act as stand-ins for special effects that are fully visually realized in playback software 1104. These custom nodes, for example, perform video texturing, identify groups of objects which can be clicked-on to cause button events, execute instructions, and contain interpreted programs. A full description of nodes and how to create custom nodes is contained in *The Inventor Toolmaker*, published by Addison-Wesley Publishing Company, the full text of which is incorporated herein by reference.

An Inventor scene graph is a "directed acyclic tree." Nodes are the connecting points of the tree's branches. Some nodes reside at the end of a branch, and some nodes have more nodes on branches "beneath" them. Nodes under another node are referred to as "children" of the containing node. The children of Inventor's SoGroup nodes are examples of nodes beneath other nodes. A more detailed explanation of nodes can be found in the two above-referenced texts.

While more information about the C++ object oriented programming language can be found in many reference books, it is important to note that Inventor is written in C++ and uses its class system. That is, new "classes" or "types" of objects can be derived from others. When one object is derived from another it inherits much of the parent's behavior and data carrying ability. Therefore, when a node is derived from Inventor's SoGroup node, one of the primary traits it will inherit is the ability to have many children beneath it in the scene graph. However, the concept of children in the scene graph should not be confused with the concept of children in a class inheritance derivation. Once a scene is composed using composition software 1102, it is written out as a standard Open Inventor file, with the addition of the special nodes in its scene graph.

Once composed, the virtual scenes in the Open Inventor file can be played using playback software 1104. Playback software 1104 runs on graphics computer 806 (e.g., an Onyx Reality Engine$^2$ computer). Playback software 1104 is based on the Performer software, available from Silicon Graphics, Inc. Performer is a high-performance, multi-processor toolkit for visual simulation. The primary reason for separating composition software 1102 from playback software 1104 in this illustrated embodiment is that Performer is higher performance than Inventor. It is foreseen that future implementations of composition software 1102 and playback software 1104 may combine functionality into a single software program with communication being accomplished programmatically rather than through files.

Playback software 1104 includes an Open Inventor file reader. The Open Inventor file reader is based on demonstration programs available from Silicon Graphics, Inc. The Open Inventor file reader incorporates large parts of Open Inventor into playback software 1104 to load the Open Inventor files from composition software 1102 and convert them into the (different style) scene graphs needed by the Performer software.

Figure 12:
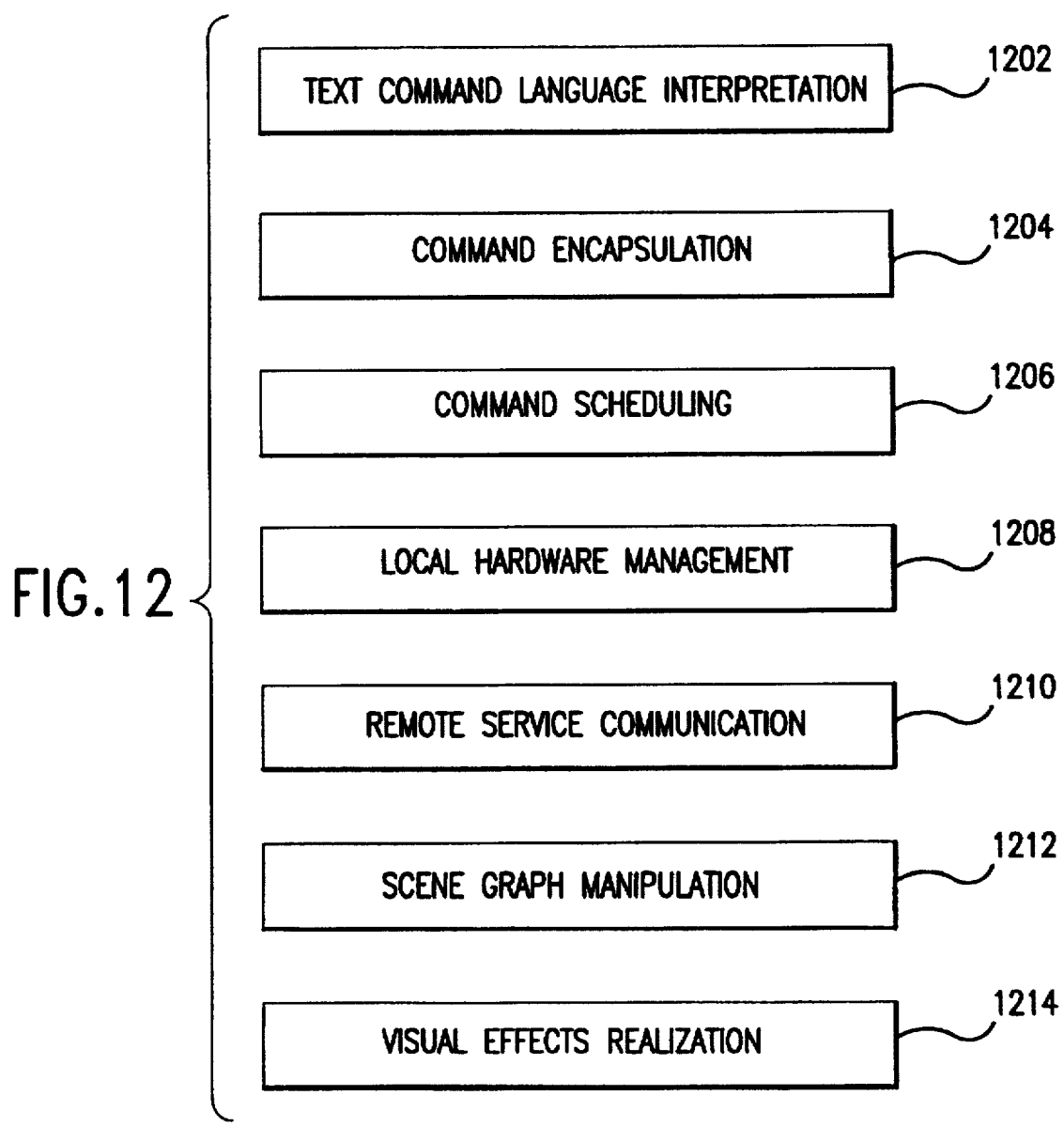
FIG. 12 is a block diagram illustrating the modules of the playback software of the present invention.

Operation of playback software 1104 is centered around recognizing events on stage and scheduling and executing commands in response to the on-stage events. While executing commands, playback software 1104 controls communications between internal hardware and server programs, manipulates the scene graph, and realizes visual effects. These functions are performed by the components of playback software 1104, illustrated in FIG. 12.

The components of playback software 1104 include a text command language interpretation module 1202, a command encapsulation module 1204, a command scheduling module 1206, a local hardware management module 1208, a remote service communication module 1210, a scene graph manipulation module 1212, and a visual effects realization module 1214. Operation of each of these modules is described below.

Text command language interpretation module 1202 responds to on-stage events. When an event occurs (e.g., a performer's click on an object in the scene, or the performer walking through on-stage trigger points), a textual description of the command(s) to execute in response to the event is interpreted into actual computer commands. These text descriptions are written into nodes during scene composition using composition software 1102.

Command encapsulation module 1204 manages commands. A command encapsulates an object, and a member function and parameters to call on that object.

Command scheduling module 1206 receives a command and either an absolute time or a relative time at which to execute the command. The command is then stored or held until the appropriate time for execution. The command may execute once and deschedule itself or may execute multiple times before descheduling itself.

Local hardware management module 1208 manages local hardware. For example, within the Onyx computer, the Reality Engine$^2$ graphics subsystem and the Sirius video subsystem hardware must be managed and controlled. For the Sirius video subsystem, the loading of video textures must be managed and the source of the video must be controlled. For the Reality Engine2 graphics subsystem, graphics must be controlled. For example, at the end of a scene in a show, in the preferred implementation of the invention, the screen is turned blue.

Remote service communication module 1210 allows playback software 1104 to communicate with a number of server programs that provide playback software 1104 with information about the performer's position on stage, the puppeteer's body motion, as well as various operator commands. The server programs are discussed below.

Scene graph manipulation module 1212 controls motion of objects in the scene based on Button, Mover and Placer nodes. Button nodes are derived from Inventor's SoGroup nodes. As for SoGroup nodes, Button nodes have other nodes (children) beneath them in the scene graph. A button node "picks up" interaction and motion information from Mover and Instructor nodes which sit to the left of it in the scene graph at the same level. Mover and Instructor nodes are derived from Inventor's SoSwitch node. A SoSwitch node allows the programmer to select (at run time) which single branch or child under it is active in the scene graph, with all other branches or children being ignored. A more detailed explanation of nodes is contained in the two above-reference texts.

A Mover nodes switching behavior (given to it by its parent class, SoSwitch) causes the selected Placer node to position the children of the associated Button node. These Placer nodes effectively act as key frame positions for the children of the associated Button node. Changes in key frame position from Placer node to Placer node can also be done either automatically or under the control of commands. Note that while these nodes were created using Open Inventor, their behavior is the same after being read by the reader code and turned into a performer style scene graph.

Visual effects realization module 1214 produces visual effects such as smoke, fire, explosions, and the like.

The server programs which communicate with playback software 1104 are illustrated in FIG. 13. The server programs include a playback server 1302, a pointer server 1304, a puppeteer server 1306, a movie_buttons server 1308, a blue server 1310, an audio caster server 1312 and a spaceball caster server 1314. The function of each of these servers is described below.

Playback server 1302 accepts commands to playback compressed video segments to be texture-mapped onto geometry in the three-dimensional scene. Playback server 1302 is based on the Dmplay demonstration program available from Silicon Graphics, Inc. To produce playback server 1302, the Dmplay demonstration program was modified using shared memory variables to include multi-speed playback and the ability to accept multi-casted commands from playback software 1104. Playback server 1102 runs on video playback computer 802.

Pointer server 1304 sends performer position and pointing information to playback software 1104 for use in animating a flashlight effect on a screen, or for triggering events when the performer walks through trigger areas on stage. The three-dimensional position information for the performer and the pointing device is received from tracking electronics 612. Pointer server 1304 runs on graphics computer 806. The position information from tracking electronics 612 is received over a serial port, and is combined with pointing information from a local mouse of graphics computer 806. The combined pointing information is multi-casted to client programs such as playback software 1104.

Digital art elements visible on the screen can be clicked on by the performer. The nodes containing these digital art elements were tagged by the Button node they resided under in such a manner that they can be associated with the Button node. Thus, when a digital art element is "clicked" the corresponding Button node is notified of this interaction event.

The Button node makes reference to a counter (initialized to zero) to select one of the Instruction nodes underneath the Button's associated Instructor node. Then, all of the text based commands within the Instruction node are interpreted and passed to the scheduler for execution. The Button node's counter is then incremented so that the next time the performer clicks on the same digital art element the next Instruction will be executed. Note that, as for the Button/Mover/Placer node combination, the Button/Instructor/Instruction node set were created using Open Inventor and retain appropriate behavior when passed through the Inventor to Performer file reader to become a Performer style scene graph.

Puppeteer server 1306 provides a graphical user interface to the puppeteer. Puppeteer server 1306 sends information about the puppeteer's body motion to clients such as playback software 1104 for use in animating characters in the virtual stage set. In the current embodiment of the invention, the puppeteer's head position and orientation are captured using a Logitech three-dimensional head tracker (not shown). The head tracker provides this output to a serial port of graphics computer 806. Puppeteer server 1306 also receives the output of the puppeteer's space ball, which is used to control the eye rotation and smile expressions of a masked character shown on the screen.

Puppeteer server 1306 can also be used to perform "global picks." A global pick is a button click event which occurs when the performer is not pointing at anything with the hand-held pointer 118. Global picks are used, for example, to start scenes up from an initial waiting state, to wait until the end of a scene, to move to the next scene or to make camera moves inside the current scene. Puppeteer server 1306 runs, for example, on graphics computer 806.

Movie_buttons server 1306 provides a graphical user interface containing a set of selectable pages of buttons. One button is provided per compressed video movie stored on disk array 804. When pressed, each button sends a request to the playback server 1302 to play back a movie. This allows an operator to control movie playback separate from control by an on-stage performer. In the preferred embodiment, movie button server 1308 runs on video playback computer 802, with its X-Window display on graphics computer 806.

Blue server 1310 provides a means for exiting an "all blue" state that graphics computer 806 will introduce between the scenes in a show produced in accordance with a preferred embodiment of the invention. In the preferred embodiment, blue server 1310 runs on graphics computer 806.

Audio caster server 1312 may run on either of computers 802 or 806 or on any other computer which has an audio input capability and which is connected to computer 806 via Ethernet 305, for example. Audio caster server 1312 analyzes the incoming audio signals and sends frequency and amplitude information to graphics computer 806. Any number of audio channels may be used to control the scene.

Spaceball caster server 1314 runs on graphics computer 806. Alternatively, spaceball caster server 1314 may run on any computer which sends the current state of the spaceball 620 to graphics computer 806, for example, over Ethernet 305. This permits any number of spaceballs to be used to control the scene.

For purposes of illustration, the invention has been described in an embodiment with one on-stage performer and one stage screen. In alternate embodiments, two or more performers may be present on the stage. Each performer may control different aspects of the performance or one performer may control the entire performance. In addition, two or more screens may be used rather than a single screen. Furthermore, several screens may be matched edge to edge to produce a single image across multiple screens.

While various embodiments of the present invention have been described above, it should be understood that they have been presented by way of example, and not limitation. Thus the breadth and scope of the present invention should not be limited by any of the above-described exemplary embodiments, but should be defined only in accordance with the following claims and their equivalents.

We claim:

1. A virtual stage system for integrating actions of a performer on a stage with visual images, the system comprising:

media means for producing the visual images;

display means for displaying the visual images;

tracking means for tracking the position of the performer on the stage and producing a position indication; and control means for receiving said position indication from said tracking means and for controlling production of visual images by said media means as a function of the position of the entertainer on the stage such that the visual images produced by said media means move in a direction opposite of a direction of movement of the performer, wherein the visual effect of the performer being part of a virtual stage is attained.

2. The system of claim 1, wherein said media means comprises:

video means for producing video images;

graphics means for producing graphics images; and combiner means for combining said video images and said graphics images to produce said visual images.

3. The system of claim 2, wherein said video means comprises:

storage means for storing compressed video images; and decompression means for decompressing said compressed video images to produce said video images.

4. The system of claim 2, wherein said video means comprises:

video playback means for producing said video images from prerecorded video storage media.

5. The system of claim 2, wherein said video images comprise background video images and foreground video images, and wherein said video means comprises:

video playback means for producing said background video images from prerecorded video storage media;

storage means for storing compressed video images; and decompression means for decompressing said compressed video images to produce said foreground video images.

6. The system of claim 2, wherein said graphics means comprises:

processor means for generating real-time graphics images.

7. The system of claim 6, wherein said video images comprise background video images and foreground video images, and wherein said processor means further comprises:

means for texture mapping said foreground video images unto said graphics images.

8. The system of claim 7, wherein said combiner means comprises:

means for combining said graphics images containing texture mapped foreground video images with said background video images.

9. The system of claim 8, wherein said combiner mean is a matte combiner.

10. The system of claim 1, wherein said display means comprises:

a display screen having a size large enough relative to the stage so as to appear to an audience as a virtual extension of the stage; and a high definition video projection system to project said visual images unto said display screen.

11. The system of claim 1, wherein said tracking means comprises:

transmitter means attached to the performer for emitting a locating beacon; and sensor array means, mounted in fixed position relative to the stage, for receiving said locating beacon and for determining the position of the performer on the stage.

12. The system of claim 1, wherein said control means comprises:

means for causing said visual images to change as the performer moves on the stage to give the illusion to an audience that the performer is moving about in a virtual scene which includes said display means.

13. The system of claim 12, wherein said control means further comprises:

means for initiating performer control of production of said visual images upon said performer entering a predetermined first portion of the stage.

14. The system of claim 1, further comprising:

blue screen means for selectively integrating a video image of the performer into the visual image displayed on said display means to further enhance the visual effect of the performer being part of the virtual stage; and means for initiating performer control of said blue screen means upon said performer entering a predetermined portion of the stage.

15. The system of claim 14, wherein blue screen means comprises:

means for producing a video image of the performer for use in a blue screen process;

means for combining said video image of the performer with said visual image according to a blue screen process.

16. The system of claim 1, further comprising:
mouse means, controlled by the performer, to allow the performer to select an item in said visual images.

17. The system of claim 16, wherein said mouse means comprises:
pointer means for determining an orientation relative to said display means;
means for determining a position of said pointer means relative to said display means;
means for using said orientation and said position of said pointer means to determine a vector between said pointer means and an item in said visual images; and
means for visually showing said vector in said visual images.

18. The system of claim 1, wherein the visual images on the display means move to the right as the performer moves to the left.

19. The system of claim 1, wherein as the performer moves towards the display means the control means cause the media means to zoom into the image being displayed.

20. A system for providing interaction between an entertainer and a display device on a stage, the system comprising:
means for producing images to be displayed by said display device;
means for tracking the position of the entertainer on the stage and providing a position indication for the entertainer; and
means for receiving said position indication and for controlling the production of the images to be displayed as a function of the position of the entertainer on the stage such that the images move in a direction opposite of a direction of movement of the entertainer.

21. A method for visually simulating an interactive performance within a virtual environment having a plurality of scene images, the method comprising the following steps:
displaying the scene images to an audience;
tracking performance movements of an on-stage performer; and
altering, in response to the performance movements of the on-stage performer, the scene images being displayed such that the scene images moves in a direction opposite of a direction of movement of said on-stage performer so that said performer appears to the audience to be interacting within the virtual environment.

22. The method of claim 21, wherein said displaying step comprises:
producing video images;
producing graphics images; and
combining said video images and said graphics images to produce said scene images.

23. The method of claim 22, wherein said step of producing video images comprises:
retrieving compressed video images; and
decompressing said compressed video images to produce said video images.

24. The method of claim 22, wherein said step of producing video images comprises:
producing background video images and foreground video images.

25. The method of claim 24, wherein said step of producing graphics images, comprises:
generating real-time graphics images.

26. The method of claim 25, wherein said combining step comprises:
texture mapping said foreground video images unto said graphics images to produce texture mapped graphics images; and
combining said texture mapped graphics images with said background video images.

27. The method of claim 21, further comprising:
selectively integrating a video image of the performer into the scene images displayed to the audience to further enhance the visual effect of the performer being part of the virtual environment.

28. A virtual stage system for integrating actions of a performer on a stage with visual images, the system comprising:
media means for producing the visual images;
display means for displaying the visual images;
tracking means for tracking the position of the performer on the stage and producing a position indication; and
control means for receiving said position indication from said tracking means and for controlling production of visual images by said media means as a function of the position of the entertainer on the stage, wherein the visual effect of the performer being part of a virtual stage is attained, said control means comprising:
means for causing said visual images to change as the performer moves on the stage to give the illusion to an audience that the performer is moving about in a virtual scene which includes said display means, and
means for initiating performer control of production of said visual images upon said performer entering a predetermined first portion of the stage.

29. A virtual stage system for integrating actions of a performer on a stage with visual images, the system comprising:
media means for producing the visual images;
display means for displaying the visual images;
tracking means for tracking the position of the performer on the stage and producing a position indication;
control means for receiving said position indication from said tracking means and for controlling production of visual images by said media means as a function of the position of the entertainer on the stage, wherein the visual effect of the performer being part of a virtual stage is attained;
blue screen means for selectively integrating a video image of the performer into the visual image displayed on said display means to further enhance the visual effect of the performer being part of the virtual stage; and
means for initiating performer control of said blue screen means upon said performer entering a predetermined portion of the stage.

30. The system of claim 29, wherein blue screen means comprises:
means for producing a video image of the performer for use in a blue screen process;
means for combining said video image of the performer with said visual image according to a blue screen process.

31. A virtual stage system for integrating actions of a performer on a stage with visual images, the system comprising:

media means for producing the visual images;

display means for displaying the visual images;

tracking means for tracking the position of the performer on the stage and producing a position indication;

control means for receiving said position indication from said tracking means and for controlling production of visual images by said media means as a function of the position of the entertainer on the stage, wherein the visual effect of the performer being part of a virtual stage is attained; and mouse means, controlled by the performer, to allow the performer to select an item in said visual images, said mouse means comprising:

pointer means for determining an orientation relative to said display means, means for determining a position of said pointer means relative to said display means, means for using said orientation and said position of said pointer means to determine a vector between said pointer means and an item in said visual images, and means for visually showing said vector in said visual images.

\* \* \* \* \*